US006978825B1

(12) United States Patent
Baylot et al.

(10) Patent No.: US 6,978,825 B1
(45) Date of Patent: Dec. 27, 2005

(54) DEVICE AND PROCESS FOR THE HEAT INSULATION OF AT LEAST ONE UNDERWATER PIPE AT GREAT DEPTH

(75) Inventors: Michel Baylot, Marseille (FR); Raymond Hallot, La Ciotat (FR); Regis Pionetti, Paris (FR); Xavier Rocher, Chatou (FR)

(73) Assignee: Bouygues Offshore, Saint Quentin en Yvelines (FR)

( * ) Notice: Subject to any disclaimer, the term of this patent is extended or adjusted under 35 U.S.C. 154(b) by 0 days.

(21) Appl. No.: 09/623,208

(22) PCT Filed: Dec. 30, 1999

(86) PCT No.: PCT/FR99/03322

§ 371 (c)(1),
(2), (4) Date: Aug. 29, 2000

(87) PCT Pub. No.: WO00/40886

PCT Pub. Date: Jul. 13, 2000

(30) Foreign Application Priority Data

| Dec. 31, 1998 | (FR) | ................................. 98 16791 |
| Jan. 26, 1999 | (FR) | ................................. 99 00985 |

(51) Int. Cl.⁷ ............................................. F28D 3/00
(52) U.S. Cl. ..................... 165/45; 62/260; 166/302; 138/32; 138/38
(58) Field of Search .................. 165/45, 155, 154; 62/260; 166/57, 58, 302; 138/32, 38, 114

(56) References Cited

U.S. PATENT DOCUMENTS

| 2,707,095 | A | * | 4/1955 | Parsons et al. ................ 165/45 |
| 3,698,440 | A | * | 10/1972 | Matthieu et al. ............. 138/114 |
| 3,768,547 | A | | 10/1973 | Best .............................. 165/45 |
| 3,809,149 | A | * | 5/1974 | Deutsch ........................ 165/45 |
| 3,933,182 | A | * | 1/1976 | Costes .......................... 138/114 |
| 3,948,313 | A | * | 4/1976 | Best .............................. 165/45 |
| 3,990,502 | A | * | 11/1976 | Best .............................. 165/45 |
| 4,327,560 | A | * | 5/1982 | Leon et al. .................... 62/260 |
| 4,408,657 | A | * | 10/1983 | Pugh ............................ 138/112 |
| 5,050,386 | A | * | 9/1991 | Krieg et al. ................... 62/260 |
| 6,000,438 | A | | 12/1999 | Ohrn ............................ 138/149 |
| 6,058,979 | A | * | 5/2000 | Watkins ....................... 138/114 |
| 6,199,593 | B1 | * | 3/2001 | Schmiade .................... 138/114 |

FOREIGN PATENT DOCUMENTS

| FR | 2 400 088 | 3/1979 | ............. E04B 1/76 |
| GB | 2 281 373 | 3/1995 | ........... F16L 59/00 |

* cited by examiner

*Primary Examiner*—Terrell McKinnon
(74) *Attorney, Agent, or Firm*—Cohen, Pontani, Lieberman & Pavane

(57) ABSTRACT

The present invention relates to a device for the heat insulation of at least one underwater pipe (1) intended to be laid on the sea bed at great depth, comprising an insulating coating surrounding the latter and a protective envelope (3), characterized in that said insulating coating comprises a virtually incompressible liquid/solid phase change material (4) with a melting temperature $T_0$ higher than that $T_2$ of the medium surrounding the pipe in operation and less than that $T_1$ of the effluents circulating in the pipe, and said material (4) preferably being impregnated in an absorbent matrix (2) surrounding the pipe (1), preferably nearest its outer surface, which protective envelope (3) is resistant and deformable and ensures a containment against and about said insulating coating.

30 Claims, 9 Drawing Sheets

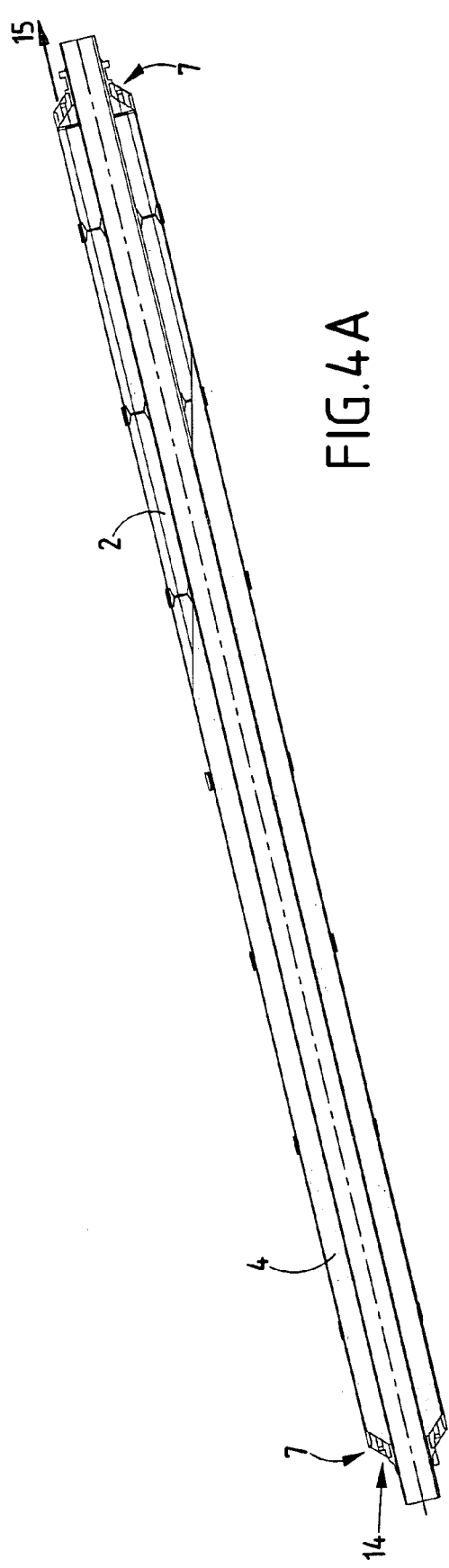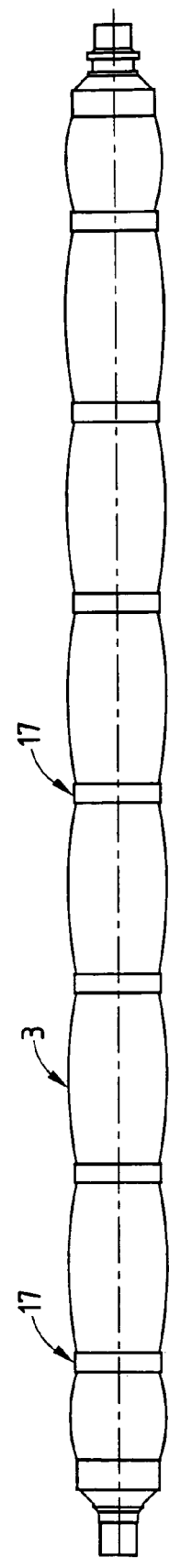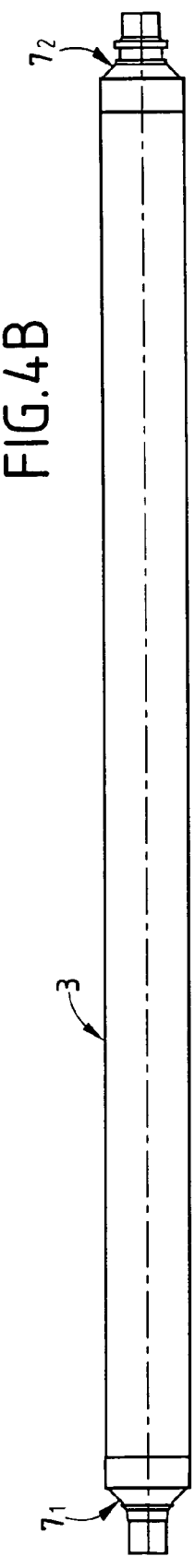
FIG.4A
FIG.4B
FIG.4C

DEVICE AND PROCESS FOR THE HEAT INSULATION OF AT LEAST ONE UNDERWATER PIPE AT GREAT DEPTH

BACKGROUND OF THE INVENTION

1. Field of the Invention

The present invention has for its object devices and processes for the heat insulation of least one underwater pipe at great depth.

The technical sector of the invention is the domain of the manufacture and assembly of an insulation system outside and around the pipes in which hot effluents, of which it is desired to limit heat losses, circulate.

This invention is applied more particularly to the developments of deep-sea oil fields, i.e. oil rigs installed on the open sea, in which the surface equipment is generally located on floating structures, the well heads being on the sea bed. The pipes concerned by the present invention are either links between well heads, or the part resting on the bed of the bed/surface links.

2. Description of the Related Art

Deep-sea developments are at the present time effected at water depths reaching 1500 meters. Future developments are envisaged at depths of up to 3000 meters and more.

The principal application of the invention is the heat insulation of pipes or lines immersed under water and more particularly at great depth, beyond 300 meters, and conveying hot oil products of which too great a cooling would be problematic both during normal production and in the case of production being stopped.

In effect, in this type of application, numerous problems are raised if the temperature of the oil products decreases by a significant considerable value with respect to their production temperature which is generally beyond 60 to 80° C., while the temperature of the surrounding water, especially at great depth, may be less than 10° C. If the oil products cool for example below 30° to 60° C., for an initial temperature of 70 to 80° C., the following is generally observed:

- a considerable increase in the viscosity which then reduces the flowrate of the pipe,
- a precipitation of dissolved paraffin which then increases the viscosity of the product and of which the deposit may reduce the useful internal diameter of the pipe,
- the flocculation of the alphaltenes inducing the same problems,
- the sudden, compact and massive formation of gas hydrates which precipitate at high pressure and low temperature, thus suddenly obstructing the pipe.

Paraffins and alphaltenes remain attached to the wall and then require cleaning by scraping the inside of the pipe; on the other hand, the hydrates are still more difficult, and even impossible to remove.

The function of the heat insulation of such pipes is therefore to delay cooling of the oil effluents conveyed, not only during established production for their temperature to be for example at least 40° C. on arriving at the surface, for a production temperature at the entrance of the pipe of 70° C. to 80° C., but also in the case of reduction or even stoppage of production in order to avoid the temperature of the effluents descending for example below 30° C. in order to limit the problems mentioned above or at least allow them to be rendered reversible.

Moreover, when such pipes are to be laid at depths greater than 300 meters, the ambient pressure of at least 30 bars prevents the use of high-performance heat insulators which are encountered on land or at shallow immersion, as they all use gases of which the heat conductivity is in effect very low and whose convection is blocked by a solid, porous, cellular or fibrous material: however, the compressivity of the gases does not allow these conventional heat insulators to withstand high outer pressures.

Japanese Patent Application No. JP2176299 published on Oct. 25, 1991 might also be cited, which describes a device for insulating metallic or synthetic resin tubes for supplying hot water in buildings and of which it is desired to conserve the temperature at more than 50° C. after one hour of stoppage of supply of hot water, in an ambient temperature of 13° C. for example: to that end, it describes a structure comprising a tube for the circulation of hot water, which is preferably deformable to facilitate laying thereof, with a layer of porous material imbibed with paraffin to about 200% and covering it, and another layer of refractory material covering the periphery of the assembly; the use of paraffin makes it possible to have an advantageous coefficient of heat insulation although less than the heat insulators mentioned above and comprising gas, but the capacity of heat accumulation of this Japanese device is reinforced by the presence of the outer refractory layer making it possible to reduce heat loss with the advantage of being able to cut the whole of this structure at any spot in order to facilitate assembly thereof and without loss of the heat accumulation power. However, such a solution cannot be used in water, especially at great depth where it is necessary to be able to withstand a considerable outer hydrostatic pressure, while ensuring sufficient containment in order to avoid any risk of pollution and/or loss of thermal efficiency. Moreoer, it does not contribute the specific characteristics described and claimed in the present invention.

Moreover, other specific types of heat insulation compatible with deep immersions have rathermore been developed, which may be grouped in three families, namely:

- the outer coatings made of solid plastic such as polyurethane, polyethylene, prolypropylene . . . but whose heat conductivity is fairly average since of the order of 0.2 to 0.3 Watt/meter/degree Celsius, which may be sufficient in continuous production but insufficient to preserve a minimum temperature for a given time in the event of stoppage of production,
- the coatings made of syntactic materials constituted by hollow balls containing a gas and resistant to the outside pressure and embedded in various binding agents such as concrete, epoxy, elastomer, polypropylene, etc . . . : the ones with highest performance are the syntactic materials based on epoxy binding agent and on hollow glass microspheres of fairly low conductivity and interesting since of the order of 0.10 to 0.15 watt/meter/degree Celsius, but the cost of these coatings is very high,
- the "pipe in pipes" in which a first inner tube conveying the effluents is disposed concentrically in a second tube resistant to the outside hydrostatic pressure; the annular space included between the two tubes may either be filled with heat insulator with very low heat conductivity (0.02 Watt/meter/degree Celsius) and which, in order not to be crushed, must be left at atmospheric pressure, or a vacuum may be created therein: such a solution necessitates partitions disposed longitudinally and perfectly tight, at regular intervals, for questions of safety, and complicates the construction and positioning of such assemblies which are, moreover, very expensive.

Another technique consists in prefabricating shells of syntactic foam and in assembling them around the pipe or in making a continuous coating of syntactic foam around said pipe. We would recall on this subject that the syntactic foam is constituted by hollow microspheres containing a gas and bonded by a resin generally of the epoxy type.

These deep-sea insulation technologies use very high-performance products which are extremely expensive and difficult to employ on a large scale.

In the case of installing single pipes or so-called bundles of pipes, it is generally preferred to manufacture said pipes on land in unitary lengths of 500 to 1000 m which are then pulled from the open sea with the aid of a tugboat. In the case of pipes of several kilometers, the first length is pulled, which is joined to the following, the tugboat maintaining the whole in traction during the joining phase, which may last several hours. When all the pipe or bundles of pipes has been put in the water, the whole is towed, generally rubbing on the sea-bed, towards the site, where it is then placed in position.

The insulation of the pipe or pipes or of the bundle is then protected by an outer envelope which has a double function: —on the one hand that of avoiding damage which might occur during towing, which may in certain cases take place over distances of several hundreds of kilometers, which requires using fairly resistant materials such as steel, thermoplastic or thermosetting compound or a composite material; —on the other hand, that of creating a containment around the insulation system.

Such containment is necessary in the case of outer insulating coatings constituted by shells of syntactic foam assembled around the pipes, as the interstices existing between the various shells, as well as the space between the shells and the outer envelope, are filled with a virtually incompresssible product, which is generally fresh water or passivated sea water or any other product compatible with the internal components.

In effect, with sea-beds of 2000 m, the hydrostatic pressure is of the order of 200 bars, or 20 Mega Pascals, which implies that all the pipes and the insulating system thereof must be capable of withstanding not only these pressures without degradation during pressurizations and depressurizations of the pipe in which the hot fluid circulates, but also the temperature cycles which will generate variations in volume of the different components as well as of the interstitial fluids, and therefore positive or negative pressures which may lead, if the outer envelope is tight, to partial or total destruction thereof either by exceeding the stresses admissible, or by implosion of this outer envelope (negative variations of internal pressure).

If said outer envelope is not tight, the assembly will then be at equal pressure with respect to the outer pressure, but this will then result in exchanges of fluids between the interior of the bundle and the outer medium. In the case of a filling of the interstices of the bundle with fresh water, passivated sea water or any other product compatible with the internal components as indicated hereinabove, as it is in that case sought to avoid fluid exchanges with the outer medium, one is led to arrange bags constituted by a supple membrane of elastomer type making it possible to contain the variations in volume by maintaining the variations in pressure at a reasonable level but these bags then complicate assembly of the insulating device and do not enable the stresses to be distributed in uniform manner.

The problem raised is therefore that of being able to produce an insulation of at least one underwater pipe intended to be laid on the sea-bed in particular at great depth, of which the insulating coating can withstand not only the hydrostatic pressure but also all the efforts associated with its own weight, and induced upon laying during which the pipe undergoes frictions and is exposed to risks of punching; said insulating coating must make it possible to maintain for example a hot effluent such as an oil product produced for example at 60° C. at the level of the sea-bed, at a temperature above for example 40° C. when it arrives on the surface after a distance of several kilometers in the water, and, moreover, to maintain a temperature at more than 30° C. for example even after several hours of stoppage of production, and this with manufacturing costs which are less than those of present syntactic materials, while offering various possibilities of implementation, and this without risk of pollution for the environment.

BRIEF DESCRIPTION OF THE INVENTION

One solution to the problem raised is a device for insulating at least one underwater pipe (which may in effect be alone or assembled with other pipes, then constituting what is called "bundles"), intended to be laid on the sea-bed at great depth, comprising an insulating coating surrounding the latter and a protective envelope; according to the invention, said insulating coating comprises a virtually incompressible, liquid-solid phase change material with a melting temperature $T_0$ higher than that $T_2$ of the medium surrounding the pipe in operation and less than that $T_1$ of the effluents circulating in the pipe, which protective envelope is resistant (such as to abrasion, to friction, to corrosion and to mechanical impacts) and deformable (in particular to follow the variations in volume of the phase change material under the effect of the hydrostatic pressure and/or upon variations in temperatures), ensures a containment around said insulating coating, in particular a containment around and against said insulating coating.

Said insulating coating preferably comprises an absorbent matrix surrounding the pipe, preferably nearest the outer surface of said pipe, said matrix being impregnated with said virtually incompressible material.

Said insulating coating may surround the pipe directly or indirectly. In the latter case said insulating coating may surround a pipe itself already insulated, in particular by syntatic foam.

The protective envelope, bearing on the material, solidified and rigid at least on its periphery, is adapted to withstand the weight of the pipe and the frictions when the latter is laid from the surface.

More particularly, the protective envelope is deformable in order to follow the variations in volume of the insulating coating under the effect of the hydrostatic pressure and upon variations in temperature.

This envelope may present at least one gas-permeable vent so as to avoid possible accumulations of gas such as the hydrogen which might diffuse through the wall of the inner pipe, which hydrogen may be generated by the effluents circulating therein.

The object of the present invention is also achieved by a process of insulation using an insulating coating surrounding at least one underwater pipe and a protective envelope, such that:

said pipe is surrounded, preferably directly, with an insulating coating comprising a virtually incompressible, liquid-solid phase change material with a given melting temperature $T_0$, said incompressible material preferably being impregnated in an absorbant matrix, and the whole is contained in the protective envelope which must be resistant and deformable, there are made to circulate in said pipe hot effluents at a temperature $T_1$ higher than the melting temperature $T_0$ of the material while the ambient outside temperature $T_2$ is less than $T_0$, the phase change material then being liquefied, preferably in a part of the impregnation matrix from the pipe up to a limit of heat exchange equilibrium between the pipe and the envelope, beyond this limit the material being solid, when the circulation of the effluents in the pipe is stopped, the temperature of these effluents is maintained above a given temperature $T_3$ for a predetermined duration thanks to the heat transfer brought by the latent heat of solidification of the material of which the liquid part solidifies progressively on cooling.

The result is a novel device and process for insulating at least one underwater pipe intended to be laid on the sea-bed in particular at great depth, avoiding the drawbacks mentioned hereinabove in the present known devices and responding to the problem raised. In effect, the outer protective envelope does not need to be resistant to the hydrostatic pressure since it bears on a virtually incompressible material.

Such materials are chosen also to be liquid/solid phase change materials with a melting temperature $T_0$ higher than that $T_2$ of the medium surrounding the pipe in operation in order that its outer part is always solid, and therefore on the one hand resistant enough to absorb the efforts transmitted by the outer protective envelope, on the other hand, contributing a better thermal inertia. Said melting temperature $T_0$ must also be chosen to be less than that of the effluent circulating in the pipe, so that that part of this material surrounding the pipe is liquefied thanks to the calorific addition of the effluents in normal production. On the other hand, in the case of production slowing down or even in the case of stoppage thereof, said phase change material restores its calories to the effluents contained in the pipe, thanks for example to a enthalpy of fusion greater than 50 kilojoule/kilogram, which delays cooling of said effluents by as much and allows the desired objects to be achieved.

Moreover, the outer solid part of said phase change material limits the risks of pollution of this material in the surrounding medium since, in the event of the outer protective envelope tearing, the solidity of this part of the material maintains its integrity.

Said virtually incompressible material is chosen for its low heat conductivity, particularly less than 0.3 watt/meter/degree Celsius.

Said incompressible material is chosen in particular from the materials constituted by at least 90% of chemical compounds chosen from alkanes, in particular comprising a hydrocarbon chain with at least 10 carbon atoms, or salts, hydrated or not, glycols, bitumens, tars, waxes, and other fatty bodies solid at ambient temperature, such as tallow, margarine or fatty alcohols and fatty acids.

The incompressible material is preferably constituted by paraffin comprising a hydrcarbon chain with at least 14 carbon atoms.

The phase change materials described hereinabove generally present a considerable variation in volume during their change of state, which may attain 20% in the case of paraffins. The outer protective envelope must be able to adapt itself without damage to these variations in volume.

Another object of the present invention is therefore also to produce an envelope for protecting the insulation system making it possible, on the one hand, to ensure the integrity of a bundle of pipes and of its insulation system when it is towed and installed in situ and, on the other hand, to overcome the stresses generated by the differential expansion of the various components during the variations in temperature associated with the stresses due to the pressure of the sea bed.

This object is attained by a device for the heat insulation of at least one underwater pipe comprising an insulating coating surrounding the latter and a protective envelope such as according to the present invention, the outer perimeter of the transverse section of said protective envelope is a closed curve of which the ratio of the square of the length over the surface that it defines is at least equal to 13; the protective envelope, which surrounds and ensures containment of the insulating coating, follows the outer shape thereof, and its transverse section which is therefore not circular—as has been usual to do up to the present time—is an oval, a polygon such as a rectangle, or a combination of the two.

In the case of the device comprising at least two pipes disposed in the same plane, the transverse section of said envelope is of shape elongated in the same direction as this plane.

Upon variations in internal volume, the envelope will tend to be deformed towards a circular shape, which mathematically constitutes the shape presenting, with constant perimeter, the largest section.

In the case of a tight envelope of circular profile, an increase in volume generates stresses in the wall, which are associated with the increase in pressure resulting from this increase in volume.

On the contrary, in the case of a rectangular profile, an increase in volume will principally generate flexions of the planar walls, the migration of the interstitial fluids grouping together in these zones of deformation. The efforts generated in the wall will be principally bending efforts in the thickness of the wall, the greatest bendings being produced on the large sides, insofar as the envelope presents a constant thickness over its periphery and over the whole of its length.

By way of example, a circle of diameter 1 m presents an approximate section of 0.785 m$^2$ for an approximate perimeter of 3.1416 m: a square of the same perimeter presenting an approximate section of 0.617 m$^2$, this shape offers a capacity of expansion of 21.5% when, with constant perimeter, the square shape passes to a circular shape; this square shape corresponds to a value of the ratio of the square of the length of its outer perimeter of the closed curve of the transverse section of the protective envelope, with respect to the surface that said perimeter defines, equal to 16.

Similarly, a flattened rectangular shape of which the above ratio is then greater than 16 will present, with constant perimeter, a greater theoretical capacity of expansion; in this way, a rectangle with a large side measuring 1.2 m and a small side of 0.3708 m which has the same perimeter of 3.1416 m, but a section of only 0.44496 m$^2$, presents a theoretical capacity of expansion of 43.3%.

It thus appears that, the more the shape of the transverse section of the insulating coating is flattened, the better the capacity of its envelope is to absorb the expansions due to the expansion of the components under the effect of the temperature.

However, it must not be forgotten that not all of the theoretical capacity of expansion is available, as the deformation by bending of the wall will tend towards the shape of a very imperfect circle. In this way, the effective capacity of expansion is only a portion of said theoretical capacity of expansion and may then correspond to 30% or 50% depending on the quality of the material constituting the envelope, which envelope may be made of steel, thermoplastics or thermosetting compound or of composite material.

Thus, for considerable variations in volumes, profiles will advantageously be used, of which the perimeter of the transverse section of said outer envelope comprises concave reversed curvatures whose concavity is turned towards the outside of said envelope.

In the case of a profile of oval shape, a variation in internal pressure will involve a combination of bending stresses and of pure tensile stresses, as the variable curvature of the oval then behaves as an architectural vault with, however, the difference that, in the case of our envelope, the stresses are tensile stresses and not compression stresses. An oval or approximately oval shape will be thus be able to be envisaged for small capacities of expansion and it will in that case be appropriate to consider ovals with a ratio of length of the large axis $\rho_{max}$ over that of the small axis $\rho_{min}$ as high as possible, for example at least 2/1 or 3/1.

The shape of the envelope will then be selected as a function of the overall expansion sought of the volume of the insulating coating, under the effect of variations in temperature. In this way, for a system of insulation using principally materials subject to expansion, a rectangular shape, a polygonal shape or an oval shape allow an expansion by bending of the wall while inducing a minimum of tensile stresses in the outer envelope.

For a fluid presenting a great expansion under the effect of variations in temperature, such as gas oil, products of the family of alkanes (paraffins), or phase change materials, the rectangle will advantageously be flattened in order to create the necessary reserve of expansion. This expansion reserve may further be increased by creating the reversed curvatures mentioned hereinabove.

Other advantages of the present invention may be cited, but those mentioned above already show sufficient to prove the novelty and interest thereof. The following description of the Figures concerns embodiments of the invention but has no limiting character: other embodiments are possible within the scope and extent of this invention, in particular by choosing a liquid/solid phase change material specific to the applications desired in terms of depth of immersion, temperature of the ambient medium, temperature of the effluents . . .

BRIEF DESCRIPTION OF THE SEVERAL VIEWS OF THE DRAWINGS

FIGS. 3A to 3E and 4A to 4C show different phases of an example of process of insulation according to the present invention.

DETAILED DESCRIPTION OF THE INVENTION

EXAMPLE 1

Insulating Coating Based on Paraffin

Figure 1:
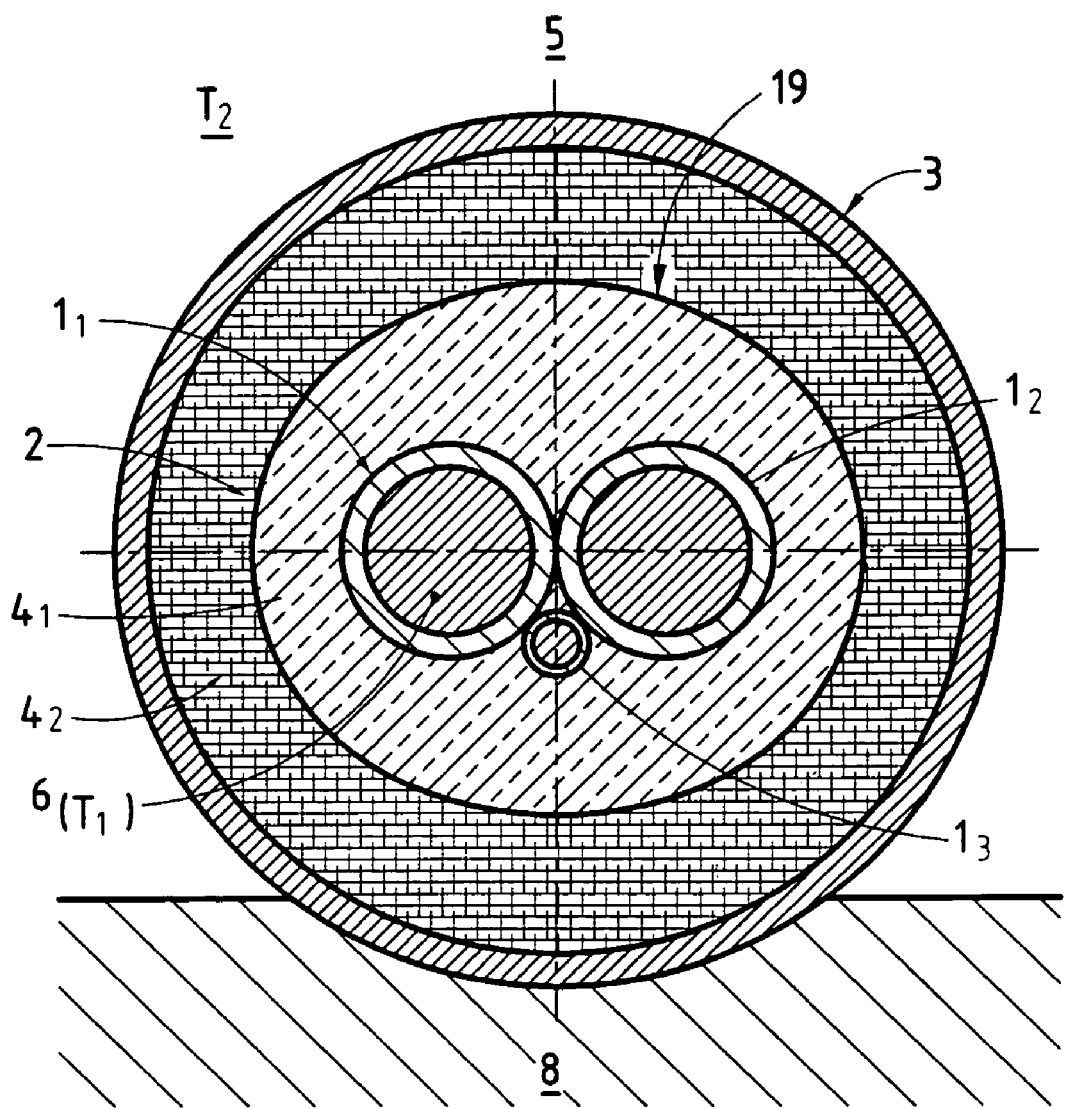
FIG. 1 is a view in section of an insulation device according to the present invention shown here with three pipes assembled together in a bundle, but which may be adapted to a single pipe or a larger number of joined pipes.

As indicated hereinabove, the device for insulating at least one underwater pipe 1 intended to be laid on the sea-bed 8 at great depth, comprises in known manner an insulating coating surrounding the latter and a protective envelope 3. According to the present invention as shown in the accompanying Figures, said insulating coating is composed of a virtually incompressible liquid-solid phase change material with a melting temperature $T_0$ higher than that $T_2$ of the medium surrounding the pipe in operation and less than that $T_1$ of the effluents 6 circulating in the pipe 1; which material 4 has a fairly low heat conductivity preferably less than 0.3 watt/meter/degree Celsius in solid phase and a enthalpy of fusion preferably greater than 50 kilojoules/kilogram: it is for example constituted by at least 90% of chemical compounds of the family of alkanes which are saturated hydrocarbons of general formula $C_n H_{2n+2}$ such as for example paraffins or waxes; said chemical compounds also being able to be salts, hydrated or not, glycols, bitumens, tars, fatty alcohols; the melting temperature of said material must therefore be included between the temperature $T_1$ of the hot effluents 6 circulating in the pipe 1 and $T_2$ of the medium 5 surrounding the pipe in operation, or in fact in general a melting temperature included between 20 and 80° C. Tetracosane of formula $C_{24}H_{50}$ presenting a temperature $T_0$ of 50.9° C. is, for example, used as paraffin.

The insulating coating according to the invention is constituted by an absorbent matrix 2 surrounding the pipe 1 nearest its outer surface and impregnated with said incompressible material 4; said protective envelope 3 is resistant and deformable and ensures a containment against and around said insulating coating: this protective envelope 3, bearing on the material 4, solidified and rigid at least on the periphery, is adapted to support the weight of the pipe 1 and the frictions when the latter is laid from the surface.

Said protective envelope 3 is deformable to compensate at least the variations in volume of the insulating coating that it contains, on the one hand under the effect of the hydrostatic pressure and, on the other hand, upon the variations in volume of the material 4 during its phase change, in order to preserve its integrity and therefore its capacity of containment; this protective envelope 3 may to that end be made of thermoplastics material such as polyethylene or of thermosetting material or even metal, of non-cylindrical cross-section. Under the action of the outside hydrostatic pressure, this protective envelope 3, forming an outer tube, is deformed and abuts on the solidified part of the material 4 which is of virtually incompressible nature: in this way, the deformation of this protective envelope 3 remains small and the resulting stresses will also be small; consequently, the thickness of said envelope may also be small.

Said matrix 2 may be constituted by a light cellular or fibrous material such as open-cell foam, particularly polyurethane foam, glass or rock fiber, woven fabrics, felt, paper, etc . . . : in fact, the nature of the material constituting said matrix must be sufficiently absorbent to be compatible with the impregnation by said phase change material 4 in order to oppose the natural convection of the liquefied part $4_1$ of said material; this matrix may possibly be heterogeneous in order to be compatible with the temperature gradient of the impregnation and it may occupy only a part of the volume of the annular space defined by said protective envelope 3 and said pipe 1 insofar as the outer part $4_2$ of said phase change material always remains solid and is therefore not subject to heat convection movements: in that case, the limit 19 between the two liquid ($4_1$) and solid ($4_2$) parts is always included in the matrix 2.

An absorbent matrix constituted by tufted floor carpet may for example be used.

Figure 3A:
Figure 3B:
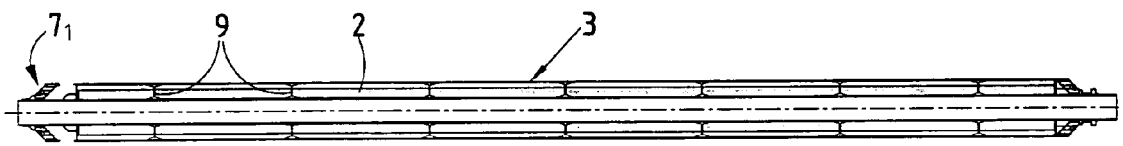
Figure 3C:
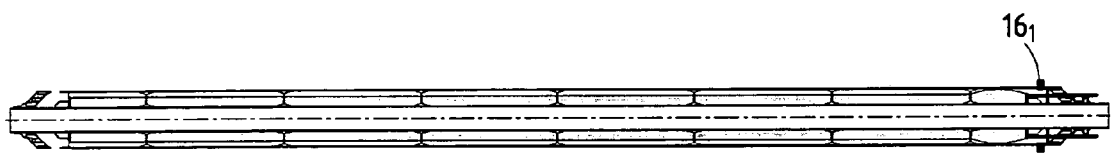
Figure 3D:
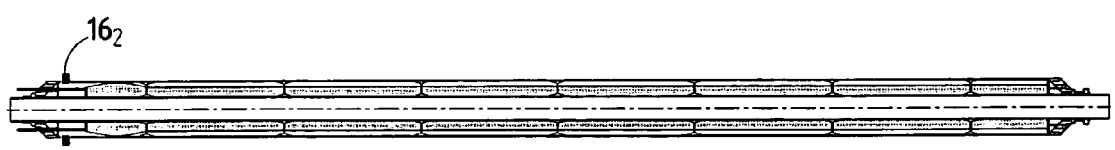
Figure 3E:
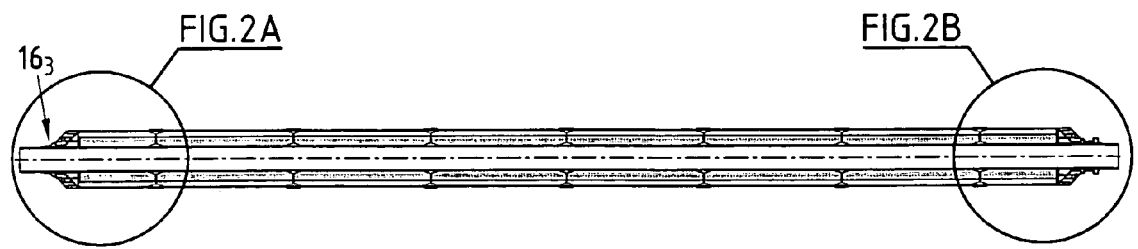

According to the example of a process for producing a device according to the invention as shown in FIGS. 3A to 4C:

an obturator 72 is fixed, such as by continuous welding 161, to one end of the outer pipe wall 1 to be insulated (FIG. 3);

there are mounted on this part of pipe 1 elements of the absorbent matrix 2 which surrounds the latter completely and uniformly and there is fitted around these matrix elements 2 the outer protective envelope 3 which is connected, such as by continuous welding, at its end to the obturator 72 (FIGS. 3B and 3C); according to a preferred embodiment, there are also interposed between elements of absorbent matrix 2, distance pieces 9 regularly spaced along the pipe 1 on which they abut and are adapted to centre and support the protective envelope 3;

a second obturator $7_1$ is positioned at the other end of the protective envelope 3, which is fixed on this envelope and on the pipe 1 such as by continuous welding $16_2$ (FIG. 3D);

in the event of distance pieces 9 having been interposed between the matrix elements 2, when all the elements of the protective envelope 3 have thus been placed in position and fixed in order thus to constitute the containment envelope, straps 17 for maintaining said distance pieces 9 plumb are placed in position (FIG. 4B);

the annular space included between the pipe 1 and the envelope 3 is completely filled, for example via one end thanks to orifices 14 made in one of the obturators 7, with said phase change material 4 liquefied and overheated above its melting temperature $T_0$, and this until the matrix elements 2 are completely impregnated thereby. To that end, said pipe may be inclined in order to fill said phase change material 4 by the lower part of the annular space as shown in FIG. 4A, which makes it possible to drive the air through vents 15 disposed in the obturator 7 opposite the one allowing filling (a vacuum may also be made before such filling);

in the case of distance pieces 9 and holding straps 17 having been previously disposed, the annular space is filled with said liquefied material 4 under pressure in order to deform the outer envelope 3 between said straps 17; the desired elastic line corresponding to the increase in volume, or overvolume, generated by the heat expansion of the material 4, liquid at filling temperature, as shown in FIG. 4B, and with respect to its volume in the solid state;

the whole is cooled, and after cooling and solidification of the material 4, the latter resumes substantially its initial volume: if filling was effected under pressure as indicated previously, the outer envelope will then be substantially straight as indicated in FIG. 4C, which will enable said straps 17 to be removed.

Figure 2A:
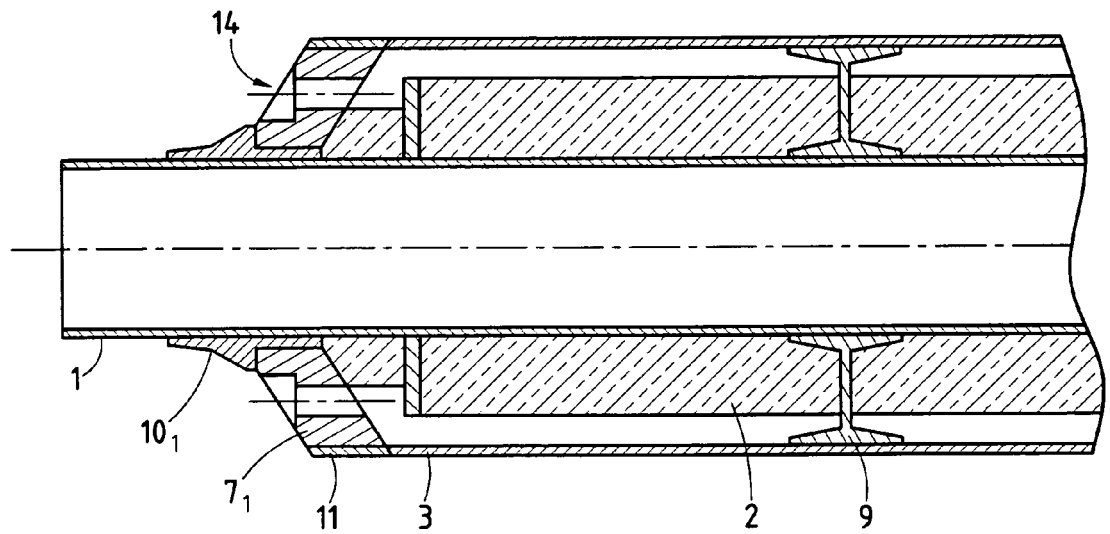
FIGS. 2A and 2B show details of the phases of the process of assembly and manufacture of the insulation device according to the invention as shown in FIG. 3E.
Figure 2B:
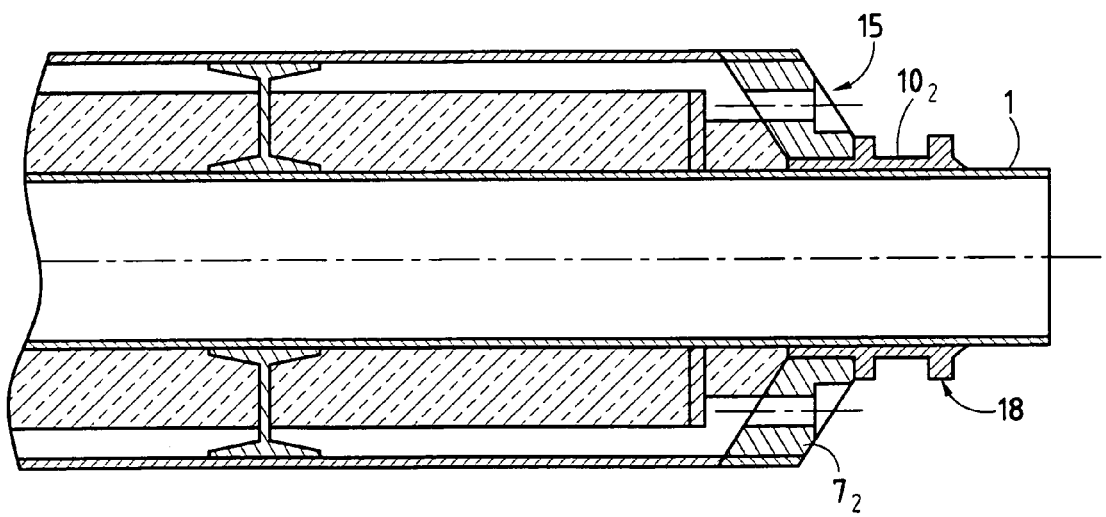

The bodies of the obturators 7 are closed, and those of the distance pieces 9 are preferable perforated to allow filling of the phase change material: these obturators and distance pieces are made of non-metallic material which is preferably hardly heat-conducting. As indicated in FIGS. 2A and 2B, said obturators may also comprise an inner ring 10 of the same material as that of the pipe 1 and an outer ring 11 of the same material as that of the outer tube 3; these two possible rings are fixed on the body of the obturator in rigid and tight manner; the one fixed on the pipe 1 may comprise a flange 10 for assisting handling.

The distance pieces 9 are necessary in the case of the mechanical strength of the rigid part 22 of the phase change material not being sufficient to support the or each pipe 1; moreover, such distance pieces 9 ensure the centering of the or each bundle of pipes in the outer envelope tube 3.

Figure 5A:
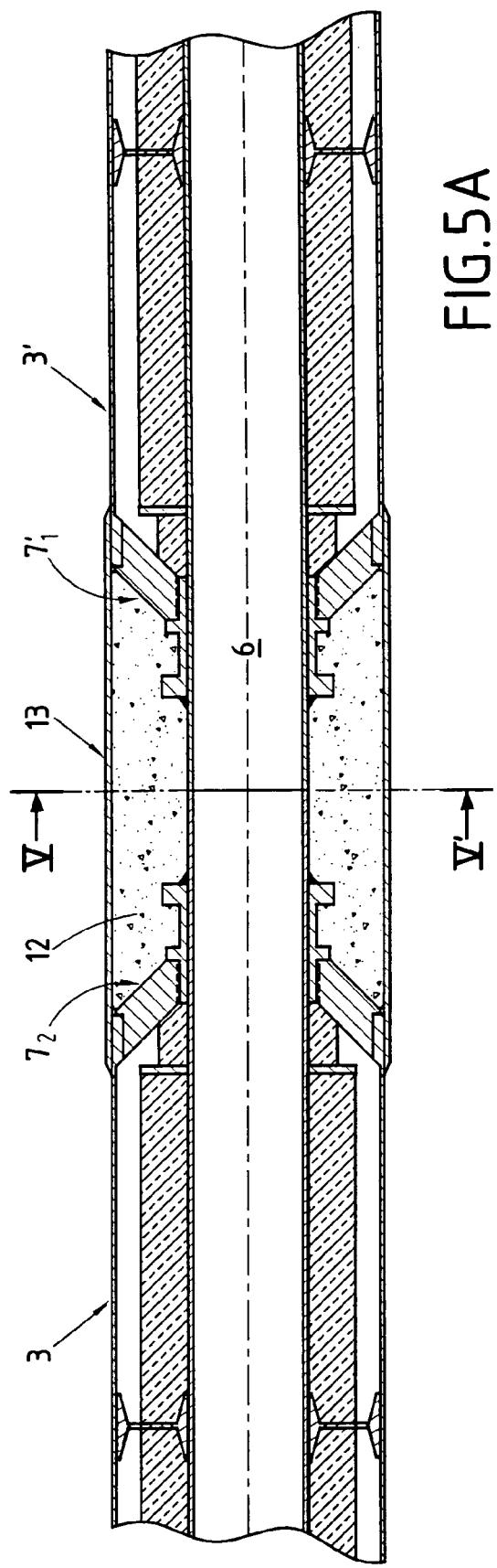
FIGS. 5A and 5B show sections of a device according to the invention specific to the connection between two sections of pipe.
Figure 5B:
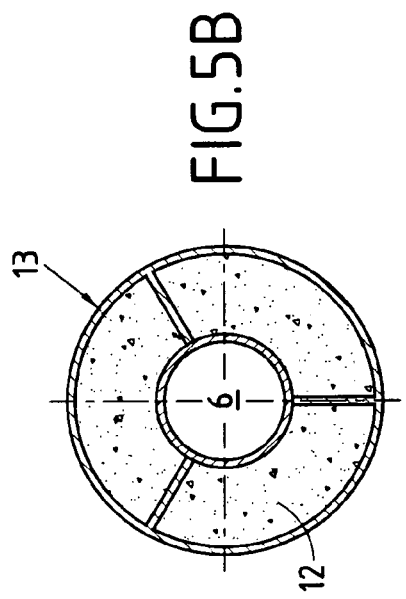

In the case of a pipe assembled in situ by welding or screwing previously insulated elementary sections, the areas of join then lack insulation and must be treated in situ: this insulation may for example be completed in this area by disposing a plurality of prefabricated impregnation blocks 12 fitting on one another around the join between sections, the whole being immobilized by overmoulding by a thermoplastics or thermosetting resin 13 as shown in FIGS. 5A and 5B.

EXAMPLE 2

Flat Bundle of at Least Two Pipes Side by Side

Figure 6:
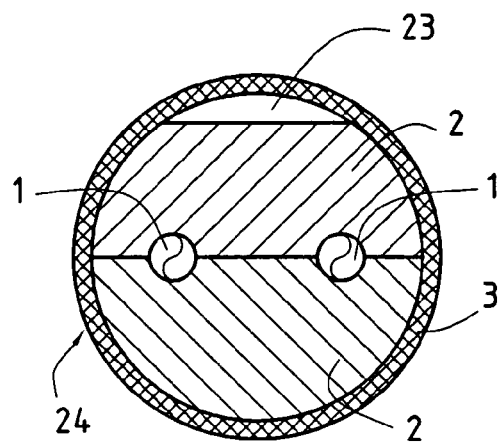
FIG. 6 is a view in section of a bundle of two pipes whose insulating coating and protective envelope are of circular shape and constitute the known prior art.

FIG. 6 is a view in section of a device for heat insulation of two underwater pipes 1 comprising an insulating coating 2 surrounding them and a protective envelope 3 containing the whole. Said insulating coating 2 is composite as in Example 1 and the perimeter 24 of the transverse section of the whole is a circle; a virtually incompressible fluid ensures integral filling of the envelope 3 by filling all the interstices which might exist between said half-shells and said envelope 3; the latter, in order not to undergo considerable stresses essentially due to the variations in temperature, as explained hereinabove, in that case comprises a continuous channel 23 over the whole of its length and against its inner wall to facilitate the movements of the virtually incompressible fluid and maintain the whole under equal pressure; the envelope 3 also presents either at its ends or at multiple points distributed over its length, orifices placing said fluid in contact with the outside either directly or indirectly via a supple membrane in order to avoid the mixture between the sea water and said virtually incompressible fluid.

Figure 7:
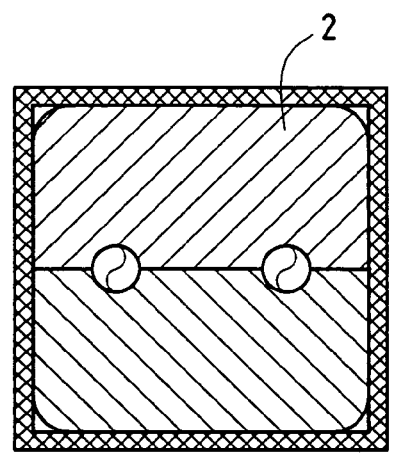
FIG. 7 is a view in section of an envelope of a bundle of conduits according to the invention, of square cross-section.

FIG. 7 is a transverse section of the device for heat insulation of the bundle according to the invention in which the outer perimeter 24 of the transverse section is of square shape and protects an insulation of an insulating coating 2 composed of paraffin as described in Example 1, preferably impregnated in an absorbent matrix.

Figure 8:
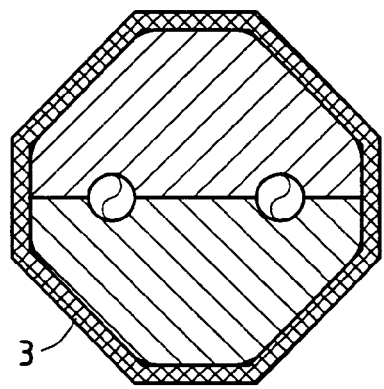
FIG. 8 is a view in section of an envelope of polygonal cross-section.

FIG. 8 is a section of a variant of the device of FIG. 7 in which the envelope 3 is octagonal.

Figure 9:
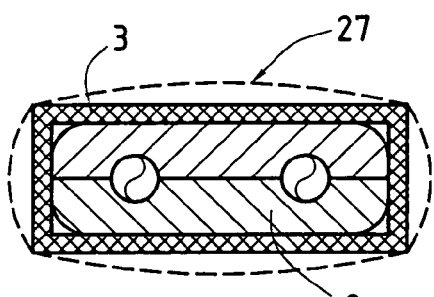
FIG. 9 is a view in section of an envelope of flattened rectangular cross-section at ambient temperature and in position of maximum expansion due to the temperature.

FIG. 9 is a section of a variant of the device of FIG. 7 in which the envelope 3 is rectangular and of flattened shape. Under the effect of the variations in temperature, the expansion of the insulating coating 2 is contained in the deformation of the envelope 3 which takes the shape of the profile of curve 37.

Figure 10:
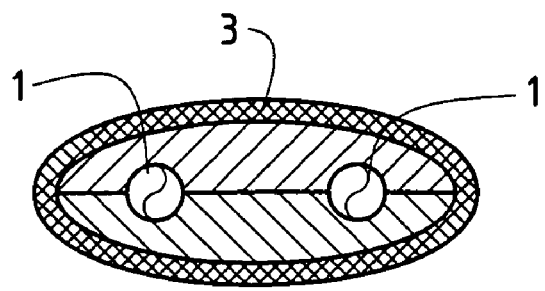
FIG. 10 is a view in section of an envelope of oval cross-section of ratio 3/1.

FIG. 10 is a section of a variant of FIG. 7 in which the envelope 3 is of oval shape, of which the ratio of length of the large axis over that of the small axis is equal to 3/1.

Figure 11:
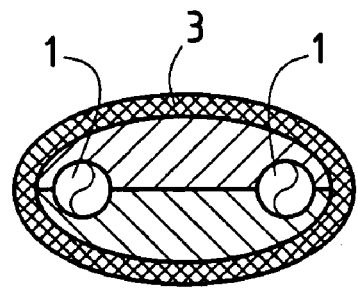
FIG. 11 is a view in section of an envelope of oval cross-section of ratio 2/1.

FIG. 11 is a section of a variant of FIG. 7 in which the envelope 3 is an oval of which the ratio of the large axis over the small axis is equal to 2/1.

Figure 12:
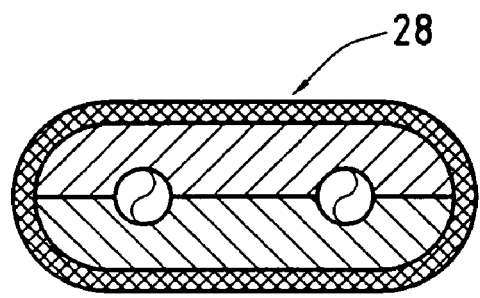
FIG. 12 is a view in section of an envelope of flattened rectangular cross-section with rounded ends.
Figure 13:
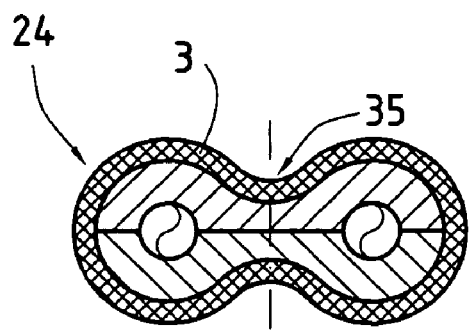
FIG. 13 is a view in section of an envelope of curved cross-section presenting points of inflexion, therefore reversed curvatures.

FIG. 12 is a section of a variant of FIG. 7 in which the envelope 3 is of flattened rectangular shape of which the small sides 28 are convex or rounded.

Figure 14:
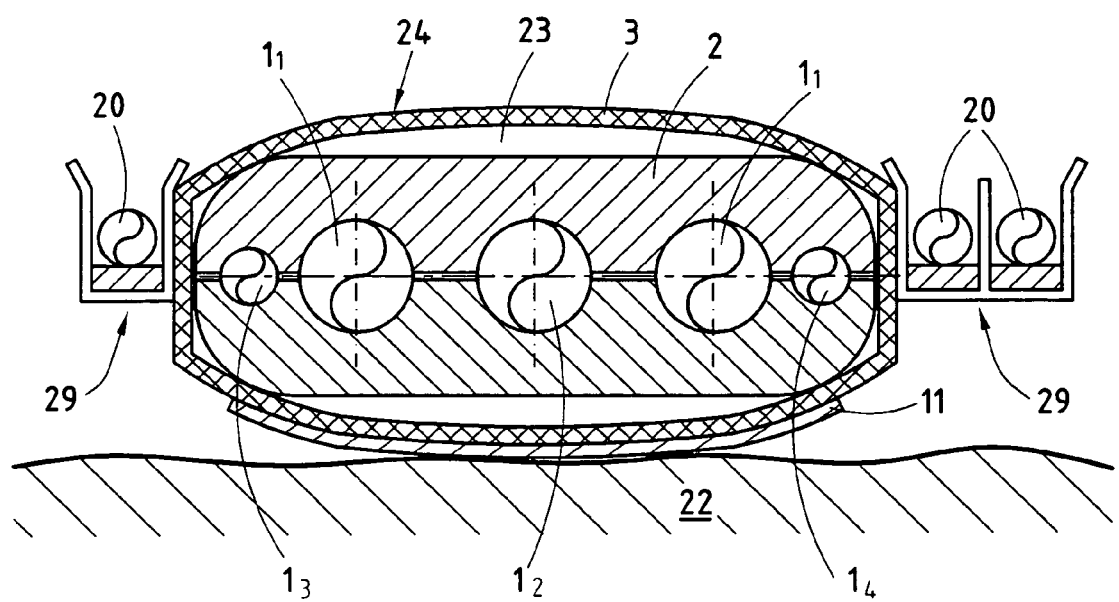
FIG. 14 is a view in section of a bundle constituted by a multiplicity of pipes, power and control cables, disposed flat according to the present invention, insulated by an insulating coating and protected by a protective envelope of flattened, substantially rectangular cross-section, and comprising a lower wear plate.

FIG. 14 (sic) is a section of a variant of FIG. 7 in which the perimeter 24 of the transverse section of the envelope 3 comprises points of inflexion, therefore concave reversed curvatures 5 (sic) increasing the capacity of expansion.

FIG. 14 is a section of a heat insulation device according to the invention of which the envelope 3 contains two pipes $1_1$ for producing oil effluents, a central pipe 12 for injecting water and two pipes for heating the whole, pipe $1_3$ serving for example to send a hot fluid from the surface support, pipe $1_4$ serving for the return; a link between pipes $1_3$ and $1_4$ existing at the second immersed end of the bundle of pipes. These pipes 1 are surrounded by an insulating coating filled with a virtually incompressible fluid such as paraffin, as described in Example 1. The bundle of pipes is equipped on its sides with chutes 29 adapted to receive umbilicals 20, said chutes being shown single to the left, and double to the right of FIG. 14.

The heat insulating device according to the invention comprises in its lower part a wear plate 11 disposed on a part of the outer perimeter 24 of the transverse section of the protective envelope 3, and preferably at least along one of the large sides of said transvser section, in that case making it possible to avoid any damage of the containment envelope 3 during the operation of towing and installation in situ: the whole resting on the sea bed 22, only the wear plate 21 rubs against the latter.

Said wear plate 21 may be made of thermoplastics material of density 1 therefore not modifying the floatability of the whole during towing nor even during the life of the bundle of pipes in situ.

Figure 15:
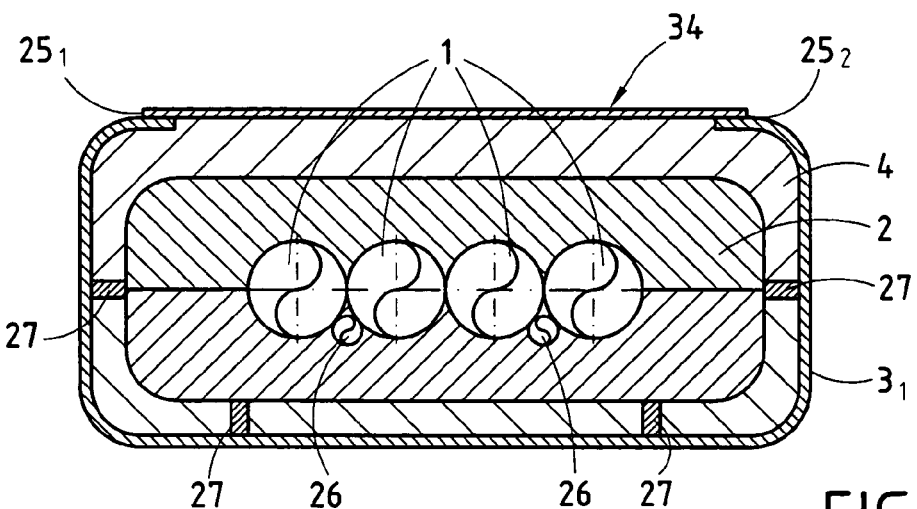
FIG. 15 is a view in section of a bundle according to the invention of flattened, substantially rectangular cross-section, manufactured from metal plates and presenting a welded lid.

FIG. 15 is a section of a bundle of which the protective envelope 3 comprises a lower part 31 in the form of an upwardly open "U" in operational position, in which are disposed said pipes 1, the insulating coating 2 and the incompressible fluid 4, said lower part 31 being closed by a lid 34 assembled on the latter in order to constitute the whole of the protective envelope 3; the latter is shown in substantially rectangular shape and made for example from a shaped metal sheet equipped with a lid 34 assembled by welding at $25_1$, $25_2$ on said envelope. The bundle contains pipes 1 and electrical heating lines 26, the whole being contained in a coating 2 supported by shims 27, disposed in the lower part of the envelope 3; said coating 2 being constituted either by an absorbent matrix impregnated with paraffin, or by syntactic foam or any other pressure-resistant insulating product; the space included between the envelope 3 and the insulating coating 2 being filled with virtually incompressible fluid 4, such as paraffin, ensuring integral filling of the inner volume of the envelope 3 which in this embodiment therefore does not follow the shape of the insulating coating 2.

Figure 16:
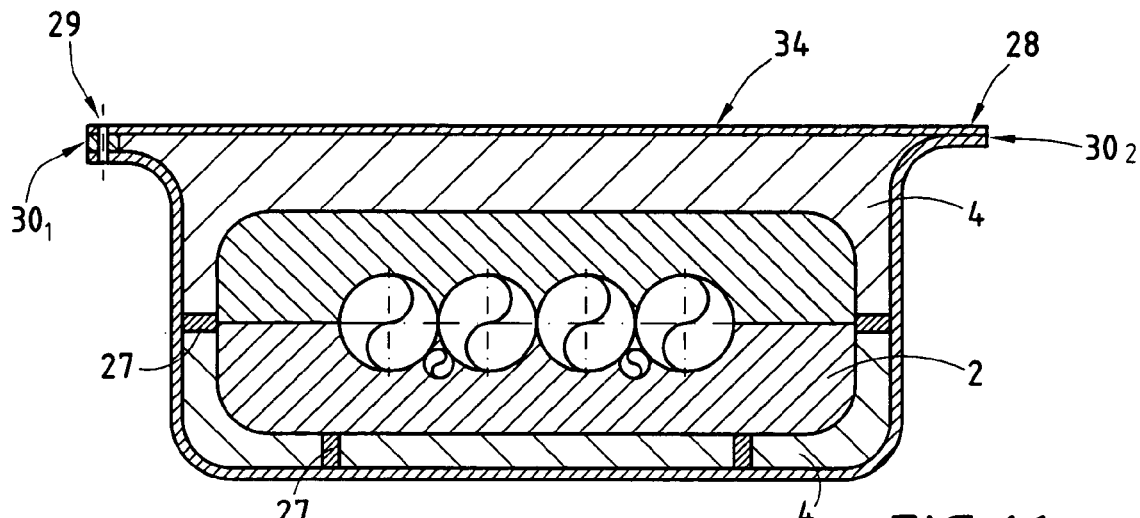
FIG. 16 is a view in section of a variant of the preceding bundle in which the lid may be either welded or assembled mechanically.

FIG. 16 is a variant of FIG. 15 in which the envelope 3 and the lid 34 present a lip-shaped overlapping 28 located outside the principal section of the bundle, which allows an assembly to be made,
   either as shown in the left-hand side of the Figure, by bolting or riveting through regularly spaced apart holes 29, associated with the positioning of an elastomer joint $30_1$ or by simple adhesion between the sheets,
   or by continuous seam welding in zone $30_2$ as shown in the right-hand side of the Figure; said seam welding being known to the person skilled in the art of boiler construction, will not be described here.

In this way, in the case of mechanical assembly, of adhesion or of the combination of the two, the envelope 3 may be made of any materials such as metals, thermoplastics, thermosetting materials or composite materials.

Figure 17:
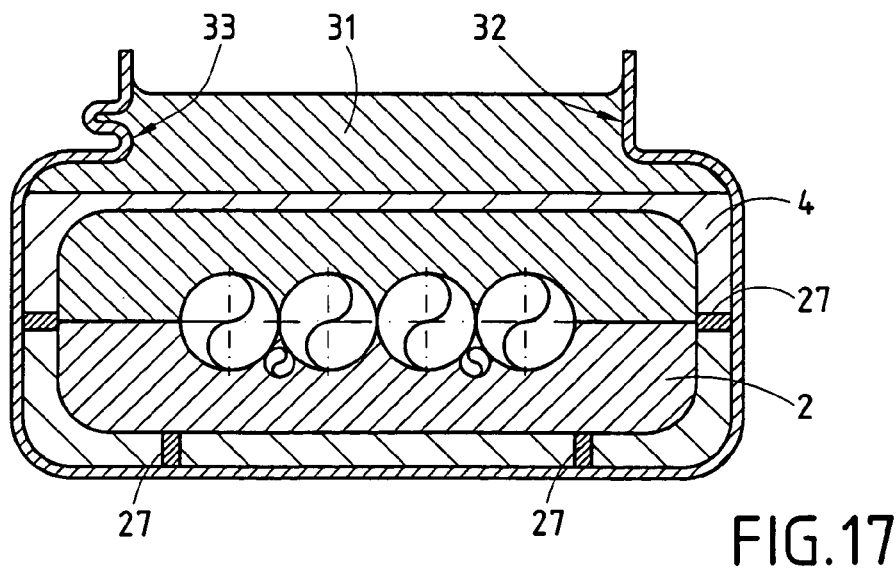
FIG. 17 is a view in section of a variant of the preceding bundle in which the heat is replaced by a supple and resistant product cast in situ.

FIG. 17 is a variant of FIG. 15 in which the lid is replaced by a layer 31 of supple material such as thermoplastics, thermosetting or polymerizable material, for example elastomer, which material closes the upper opening of the U-shaped lower part $3_1$ of the envelope 3 and is cast in situ after complete installation of all the components of the bundle, an insulating coating 2 comprising a virtually incompressible fluid 4, said insulating coating 2 being surrounded by incompressible filling fluid 4 of which the level will then be adjusted so as to allow sufficient place to ensure a sufficient thickness for the layer 31, for example 1 cm, thus allowing a sufficient adherence on the wall of the envelope 3. The contact surface is shown in the right-hand part of the Figure in the form of a right angle 32, in the left-hand part an S-shape 33 of the sheet 3 increases the contact surfaces as well as the zones subjected to shear, which shear is generally preferable to tear in adhesions.

What is claimed is:

1. A device for the heat insulation of at least one underwater pipe (1) intended to be laid on the sea bed at great depth, comprising an insulating coating surrounding the latter and a protective envelope (3), characterized in that said insulating coating comprises a virtually incompressible liquid/solid phase change material (4) with a melting temperature $T_0$ higher than that $T_2$ of the medium surrounding the pipe in operation and less than that $T_1$ of the effluents circulating in said pipe, which protective envelope (3) is resistant and deformable and ensures a containment about said insulating coating, said protective envelope being deformable to follow variation in volume of the insulating coating that it contains under the effect of hydrostatic pressure and variation in temperature.

2. The device according to of claim 1, wherein said insulating coating comprises an absorbent matrix (2) surrounding said pipe (1), preferably nearest its outer surface, and impregnated with said material (4).

3. The device according to of claim 1, wherein the protective envelope (3) abutting on the material (4) which is solidified and rigid at least on its periphery, is adapted to support the weight of the pipe (1) and the frictions when the latter is laid from the surface.

4. The device according to of claim 1, wherein the protective envelope (3) comprises at least one vent permeable to the gas that may diffuse though said underwater pipe (1) and generated by the effluents which circulate therein.

5. The device of claim 2, wherein the matrix (2) is constituted by a material having at least one characteristic selected from the group consisting of being light, cellular and fibrous and said virtually incompressible material (4) which impregnates it has a melting temperature ($T_0$) included between 20 and 80° C.

6. The device of claim 1, wherein said material (4) has a thermal conductivity less than 0.3 Watt/meter/degree Celsius in solid phase and an enthalpy of fusion greater than 50 kilojoule/kilogram.

7. The device of claim 2, wherein said matrix (2) occupies only a part of the volume of the annular space defined by said protective envelope (3) and said pipe (1).

8. The device of claim 1, further comprising distance pieces (9) regularly spaced apart along the pipe (1) on which they abut and supporting the protective envelope (3).

9. The device of claim 1, wherein the protective envelope (3) is made of thermoplastics material.

10. The device of claim 1, wherein said virtually incompressible material (4) is constituted, to at least 90%, of chemical compounds of the family of alkanes.

11. The device of claim 10, wherein said virtually incompressible material (4) comprises a paraffin comprising a hydrocarbon chain with at least 14 carbon atoms.

12. The device of claim 1, wherein the outer perimeter (24) of the transverse section of said protective envelope (3) is a closed curve of which the ratio of the square of the length over the surface that it defines is at least equal to 13.

13. The device of claim 11, wherein the outer shape of the transverse section of said protective envelope (3) is an oval.

14. The device of claim 13, wherein the ratio of length of the large axis over that of the small axis of the oval is at least 2.

15. The device of claim 12, wherein the outer shape of the transverse section of said protective envelope (3) is a rectangle.

16. The device of claim 15, further comprising at least two pipes (1) disposed along the same plane and the transverse section of said envelope (3) is of a shape elongated in the same direction as said plane.

17. The device of claim 12, wherein the perimeter (24) of the transverse section of said envelope (3) comprises concave reversed curvatures (35).

18. The device of claim 13, further comprising a wear plate (21) disposed on a part of said outer perimeter (24) of the envelope (3).

19. The device of claim 18, wherein said wear plate (21) is disposed along one of the large sides of the transverse section of said envelope (3).

20. The device of claim 12, wherein the ratio of the square of the length of the outer perimeter (24) of the transverse section of said protective envelope (3) on the surface that said perimeter defines is at least equal to 16.

21. The device of claim 12, wherein the protective envelope (3) comprises a lower "U"-shaped part ($3_1$) in which are disposed said pipes (1) and a lid (34) assembled on this envelope (3).

22. The device of claim 21, wherein said lid (34) is seam-welded.

23. The device of claim 12, wherein the protective envelope (3) comprises a lower "U"-shaped part ($3_1$) in which are disposed said pipes (1) and an upper opening closed by a layer (31) of supple material cast after installation of all the internal components.

24. The device of claim 12, wherein the envelope (3) comprises shims (27) supporting the insulating coating (2), the space included between the envelope (3) and said coating (2) being filled with a virtually incompressible fluid.

25. The device of claim 10, wherein said incompressible material (4) is a paraffin comprising a hydrocarbon chain with at least 10 carbon atoms.

26. The device of claim 1, wherein said at least one underwater pipe is disposed on said sea bed.

27. The device of claim 1, wherein said envelope is capable of varying up to about 20% by volume.

28. A process for the heat insulation of at least one underwater pipe (1) intended to be laid on the sea-bed at great depth, using an insulating coating surrounding said pipe and a protective envelope (3), characterized in that:

said pipe (1) is surrounded, preferably directly, with an insulating coating (2) comprising a virtually incompressible, liquid-solid phase change material (4) with a given melting temperature $T_0$, said incompressible material preferably being impregnated in an absorbant matrix, and the whole is contained in the protective envelope (3) which must be resistant and deformable, there are made to circulate in said pipe (1) hot effluents (6) at a temperature $T_1$ higher than the melting temperature $T_0$ of said material (4) while the ambient outside temperature $T_2$ is less than $T_0$, the phase change material (4) then being liquefied, preferably in a part of the impregnation matrix ($2_1$) from the pipe (1) up to a limit of heat exchange equilibrium (19) between the pipe (1) and the envelope (3), beyond this limit (19) the material being solid, when the circulation of the effluents (6) in the pipe (1) is stopped, the temperature of these effluents (6) is maintained above a given temperature $T_3$ for a predetermined duration thanks to the heat transfer brought by the latent heat of solidification of said material (4) of which the liquid part ($4^1$) solidifies progressively on cooling.

29. The process of claim 28, wherein:

an obturator ($7_2$) is fixed in continuous and tight manner at the end of the outer wall of pipe (1) to be insulated; and there are mounted on this part of pipe (1), elements of the absorbent matrix (2) which surround the latter completely and uniformly, there is fitted around these matrix elements (2) the outer protective envelope (3) which is connected at its end to the obturator ($7_2$), there is positioned at the other end of the protective envelope (3) a second obturator ($7_1$) which is fixed on this envelope and on the pipe (1), the annular space included between the pipe (1) and the envelope (3) is completely filled, via one end, with said phase change material (4) liquefied and overheated above its melting temperature $T_0$ and until the matrix elements (2) are completely impregnated with it, the whole is cooled.

30. The process of claim 28, wherein:

there are interposed between absorbent matrix elements (2), distance pieces (9) regularly spaced along the pipe (1) on which they abut, when all the elements of the protective element (3) have been placed in position and fixed to constitute the containment envelope, straps (17) for holding said distance pieces (9) plumb are placed in position, the annular space is then filled with said liquefied material (4) under pressure in order to deform the outer envelope (3) between said straps (17), which deformation corresponding to the increase in volume generated by the thermal expansion of the material (4) liquid at filling temperature.

* * * * *